(12) United States Patent
Dube

(10) Patent No.: US 9,901,861 B2
(45) Date of Patent: Feb. 27, 2018

(54) CHILLED AMMONIA BASED CO$_2$ CAPTURE SYSTEM WITH WASH SYSTEM AND PROCESSES OF USE

(75) Inventor: Sanjay Kumar Dube, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 213 days.

(21) Appl. No.: 13/275,552

(22) Filed: Oct. 18, 2011

(65) Prior Publication Data

US 2013/0092026 A1 Apr. 18, 2013

(51) Int. Cl.
*B01D 19/00* (2006.01)
*B01D 53/14* (2006.01)
(Continued)

(52) U.S. Cl.
CPC ......... *B01D 53/1475* (2013.01); *B01D 3/007* (2013.01); *B01D 3/145* (2013.01); *B01D 19/0015* (2013.01); *B01D 53/1418* (2013.01); *B01D 61/025* (2013.01); *B01D 61/027* (2013.01); *C02F 1/20* (2013.01); *C02F 1/441* (2013.01); *C02F 1/442* (2013.01); *B01D 2252/102* (2013.01); *B01D 2311/04* (2013.01); (Continued)

(58) Field of Classification Search
CPC ........ B01D 2311/04; B01D 2311/2626; B01D 19/0015; B01D 2252/102; B01D 3/007; B01D 53/145; B01D 53/1418; B01D 53/1475; B01D 61/025; B01D 61/027; C02F 1/20; C02F 1/441; C02F 1/442; C02F 2101/16; C02F 2103/18; Y02P 70/34; Y02C 10/04; Y02C 10/06

USPC ........................................................ 95/236
See application file for complete search history.

(56) References Cited

U.S. PATENT DOCUMENTS 4,495,031 A  1/1985  Breidenbach et al.
5,766,479 A *  6/1998  Collentro ............. B01D 61/022
                                                    210/639

(Continued)

FOREIGN PATENT DOCUMENTS

CN  101837723 A  9/2010
DE  19808433  9/1999

*Primary Examiner* — Cabrena Holecek
(74) *Attorney, Agent, or Firm* — GE Global Patent Operation; Cynthia W. Flanigan

(57) ABSTRACT

Systems and processes for reducing the energy requirements of an ammonia recovery stripper in a chilled ammonia-based CO$_2$ removal system. The systems and processes include a nanofiltration or reverse osmosis unit for physically separating the washed liquid from a wash vessel configured to receive an ammonia slip feed stream from the main absorber of the chilled ammonia-based CO$_2$ removal system and provide first and second feed streams. Relative to the washed liquid from the wash vessel, the first feed stream has a decreased ammonia molarity whereas the second feed stream has an increased ammonia molarity. The second feed stream is then fed to the ammonia recovery stripper, which reduces steam consumption. The reduced steam consumption translates to significant energy savings, among numerous other advantages. Additionally, the systems and process provide a reduction of equipment sizes related to the stripper unit as may be desired in some applications.

20 Claims, 3 Drawing Sheets

(51) Int. Cl.

| | |
|---|---|
| *B01D 61/02* | (2006.01) |
| *C02F 1/20* | (2006.01) |
| *C02F 1/44* | (2006.01) |
| *B01D 3/00* | (2006.01) |
| *B01D 3/14* | (2006.01) |
| *C02F 101/16* | (2006.01) |
| *C02F 103/18* | (2006.01) |

(52) U.S. Cl.
CPC .. *B01D 2311/2626* (2013.01); *C02F 2101/16* (2013.01); *C02F 2103/18* (2013.01); *Y02C 10/04* (2013.01); *Y02C 10/06* (2013.01); *Y02P 70/34* (2015.11)

(56) References Cited

U.S. PATENT DOCUMENTS

| | | | |
|---|---|---|---|
| 7,641,717 | B2 | 1/2010 | Gal |
| 7,846,240 | B2* | 12/2010 | Gal ........................ B01D 53/62 |
| | | | 423/234 |
| 7,862,788 | B2 | 1/2011 | Gal et al. |
| 2003/0045756 | A1* | 3/2003 | Mimura et al. ............... 564/498 |
| 2008/0307968 | A1* | 12/2008 | Kang ..................... B01D 53/62 |
| | | | 95/199 |
| 2009/0101012 | A1* | 4/2009 | Gal et al. ......................... 95/225 |
| 2010/0089110 | A1* | 4/2010 | Duncan et al. ................... 71/60 |
| 2010/0229720 | A1 | 9/2010 | Sonwane et al. |
| 2011/0100218 | A1* | 5/2011 | Wolfe ............................ 95/205 |
| 2011/0146489 | A1 | 6/2011 | Dube et al. |

* cited by examiner

CHILLED AMMONIA BASED CO₂ CAPTURE SYSTEM WITH WASH SYSTEM AND PROCESSES OF USE

BACKGROUND

The present disclosure generally relates to gas purification systems and processes of use, wherein absorbed ammonia and carbon dioxide are recovered. In particular, the present disclosure relates to wash systems and processes configured to utilize nanofiltration or reverse osmosis to reduce the steam duties of an ammonia recovery stripper for reducing the ammonia slip and other contaminants from a gas stream that has been subjected to an ammonia-based $CO_2$ removal process.

In conventional industrial technologies for gas purification, impurities, such as $H_2S$, $CO_2$ and/or COS are removed from a gas stream such as flue gas, natural gas, syngas or other gas streams by absorption in a liquid solution, e.g., in a liquid solution comprising ammonia and/or one or more amine compounds. The used liquid solution is subsequently regenerated in a regenerator column to release the impurities comprised in the solution, typically by countercurrent contacting with steam. The steam needed for regeneration is typically produced by power plant turbine system. In addition, a reboiler in fluid communication with the regeneration column may provide further release of impurities comprised in the liquid solution.

In current chilled ammonia processes and systems, ammonia slip from the main $CO_2$ absorber is first captured in a water wash vessel and subsequently regenerated in the ammonia recovery stripper by heating the ammoniated rich solution with saturated steam. The ammoniated slip solution typically has a $NH_3$ molarity of 0.1 to 2.0 mol/liter depending on the operating conditions. The current ammonia recovery process from the stripper is an expensive process (approximately 20% heat duty of the main $CO_2$ regenerator) in terms of both capital and operating cost because it is very difficult to integrate stripper overhead heat with the main regenerator network.

Accordingly, there is a need for improved systems and processes for more efficiently recovering the ammonia slip so as to provide reduced energy consumption.

BRIEF SUMMARY

Disclosed herein are gas purification systems and processes for more efficiently recovering the ammonia slip so as to provide reduced energy consumption, among other advantages. In one embodiment, a wash system for reducing ammonia slip in a chilled ammonia-based $CO_2$ removal system comprising a main absorber and regenerator and also comprises a wash vessel configured to receive a $CO_2$ lean flue gas subjected to the chilled ammonia-based $CO_2$ removal system, the wash vessel comprising a liquid for washing the $CO_2$ lean flue gas from the main absorber; a separation unit in series with the wash vessel and configured to receive washed liquid having an ammonia concentration from the wash vessel and physically separate the washed liquid into a first feed stream and a second feed stream, wherein the first feed stream has a decreased ammonia concentration relative to the ammonia concentration of the washed liquid, and wherein the second feed stream has an increased ammonia concentration relative to the ammonia concentration of the washed liquid; and a stripper system in series with the separation unit and configured to receive the second feed stream with the increased ammonia concentration.

The process for reducing an amount of ammonia in a $CO_2$ lean flue gas stream resulting from an ammonia-based $CO_2$ capture system comprising a main absorber and regenerator comprises washing the $CO_2$ lean flue gas stream from the main absorber in a wash vessel with a liquid to produce a washed liquid having an ammonia concentration; separating the washed liquid into a first feed stream and a second feed stream, wherein the first feed stream has a decreased ammonia concentration relative to the ammonia concentration of the washed liquid, and wherein the second feed stream has an increased ammonia concentration relative to the ammonia concentration of the washed liquid; and recovering ammonia from the second feed stream to produce an ammonia lean solution.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Disclosed herein are systems and processes for purification of a gas stream such as a flue gas. More particularly, the systems and processes are configured to reduce the energy requirements of prior chilled ammonia processes and systems ("CAP") used in carbon capture systems ("CCS"). The systems and processes are configured to recover absorbed ammonia and carbon dioxide ($CO_2$) from a flue gas stream that has been subjected to a chilled ammonia-based $CO_2$ removal system. More particularly, ammonia and $CO_2$ are recovered using nanofiltration or reverse osmosis on the feed stream from the wash vessel to provide a high molarity ammonia feed stream to the ammonia recovery stripper. The wash vessel is in fluid communication with the main absorber unit and is configured to receive the flue gas feed stream with the ammonia slip as well as other contaminants, i.e., the flue gas that has been subjected to ammonia-based $CO_2$ removal. By increasing the molarity of the ammonia in the wash solution being fed to the ammonia recovery stripper, Applicants have discovered that steam consumption requirements are markedly reduced. Also, by increasing the ammonia molarity, the feed solution to the ammonia recovery stripper is reduced, which directly reduces the equipment sizes for stripper, reboiler, condensers, heat exchangers, pumps etc. The reduced steam consumption directly translates into significant energy savings.

Figure 1:
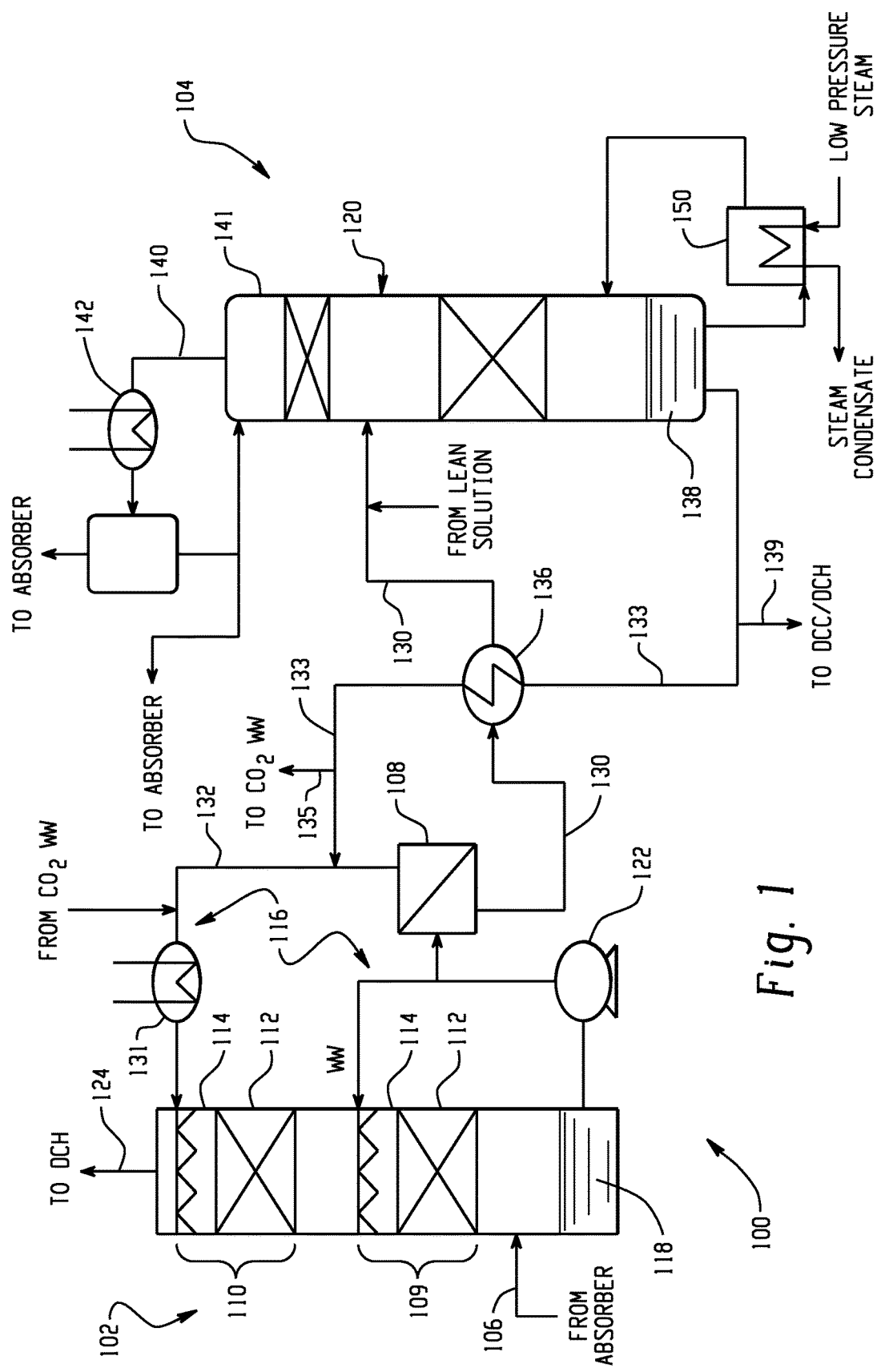
FIG. 1 schematically illustrates a gas purification system in accordance with an embodiment of the present invention.

Referring now to FIG. 1, there is schematically illustrated a partial view of wash system 100 in accordance with one embodiment for recovering ammonia slip in a chilled ammonia-based $CO_2$ removal system generally including a main absorber and regenerator for treating a flue gas, for example. The system 100 generally depicts, in series, a water wash vessel 102 for receiving an absorber retentate 106 (also referred to as the $CO_2$ lean flue gas) from a main absorber (not shown), a nanofiltration or reverse osmosis system 108, and a stripper system 104. It should be apparent that the complete chilled ammonia-based $CO_2$ removal system will include additional components such as the main absorber and main regenerator as well as flue gas conditioning components for treating the flue gas stream prior to introduction into the main absorber and $CO_2$ dehydration and compression components. Exemplary gas purification systems with these additional components, including but not limited to the absorber and the regenerator, are disclosed in U.S. Pat. Nos. 7,641,717, 7,846,240, and 7,862,788, which are incorporated by reference in their entireties.

The process stream employed in gas purification systems may be any fluid stream such as, for example, natural gas streams, synthesis gas streams, refinery gas or streams generated from combustion of materials such as coal, natural gas or other fuels. One example of process stream is a flue gas stream generated by combustion of a fuel such as, for example, coal, and provided at an output of a combustion chamber of a fossil fuel fired boiler. Examples of other fuels include, but are not limited to natural gas, synthetic gas (syngas), and petroleum refinery gas. Depending on the type of or source of the process stream, the acidic component(s) may be in a gaseous, liquid or particulate form. For ease of understanding, reference herein will be made to a flue gas stream.

In one embodiment, the flue gas stream contains several acidic components including, but not limited to, $CO_2$. By the time the flue gas stream enters the main absorber for $CO_2$ capture system, the flue gas stream may have undergone treatment to remove particulate matter (e.g., fly ash), as well as sulfur oxides (SOx) and nitrogen oxides (NOx). For example, the flue gas may be taken from a location downstream of a wet flue gas desulfurization system. However, processes may vary from system to system and therefore, such treatments may occur after the flue gas stream passes through the absorber, or not at all.

The main absorber employs an absorbent solution (disposed therein) that facilitates the absorption and the removal of a gaseous component such as carbon dioxide from the flue gas stream. In one embodiment, the absorbent solution includes a chemical solvent and water, where the chemical solvent contains, for example, a nitrogen-based solvent and, in particular, ammonia; primary, secondary and tertiary alkanolamines; primary and secondary amines; sterically hindered amines; and severely sterically hindered secondary aminoether alcohols. Examples of commonly used chemical solvents include, but are not limited to: ammonium carbonate, monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol (also called diethyleneglycolamine or DEGA), 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, 2-(2-(1-methyl-1-ethylpropylamino)ethoxy)ethanol, and the like. The foregoing may be used individually or in combination, and with or without other co-solvents, additives such as anti-foam agents, promoters such as enzymes, buffers, metal salts and the like, as well as corrosion inhibitors.

In a chilled ammonia based $CO_2$ capture system, the absorbent solution in the main $CO_2$ absorber is a solution or slurry including ammonia. The ammonia can be in the form of ammonium ion, $NH_4^+$ or in the form of dissolved molecular $NH_3$. By way of example, the absorbent solution or slurry may be comprised of ammonium carbonate, carbamate and bicarbonate ions. The absorption of the acidic components such as $CO_2$ present in the flue gas stream is achieved when the absorber is operated at atmospheric pressure and at a low temperature, for example, between zero and thirty degrees Celsius (0-30° C.). In another example, absorption of the acidic component from flue gas stream is achieved when the absorber is operated at atmospheric pressure and at a temperature between zero and ten degrees Celsius (0-10° C.). By operating at relatively low temperatures, ammonia loss within the system is minimized.

By way of example, the ammonia reacts with the $CO_2$ present in the flue gas to form ammonium carbonate, ammonium bicarbonate, ammonium carbamate, and the like and form a $CO_2$ lean flue gas stream. The process may generally be referred to as the main scrubbing process. After scrubbing, contaminants such as trace amounts of ammonia (also referred to as the ammonia slip), amine compounds and other degradation products remain in the $CO_2$ lean flue gas. In the present disclosure, the $CO_2$ lean flue gas with the contaminants is fed to a ammonia slip recovery system 100, wherein the ammonia and other contaminants are removed from the $CO_2$ lean flue gas, which may then be discharged into the atmosphere or further processed within a direct contact heater (DCH) before discharging to the atmosphere via stack.

The ammonia slip recovery system 100 includes, in series, the water wash vessel 102, the nanofiltration or reverse osmosis system 108, and the stripper system 104 to recover the ammonia, and other contaminants that may be contained therein.

The wash vessel 102 generally includes one or more absorption stages. In the exemplary embodiment shown, the wash vessel includes a first absorption stage 109 and a second absorption stage 110. The wash vessel is not limited in this regard as it is contemplated that the wash vessel may have more or less absorption stages. Each of the absorption stages may include a mass transfer device 112, a spray head system 114, and a liquid delivery path 116. The $CO_2$ lean flue gas 106 from the absorber (not shown) enters the first absorption stage 109 at a bottom portion of the wash vessel 102. While the opening is shown at the bottom portion, it is contemplated that the $CO_2$ lean flue gas 106 may be at any point in the wash vessel and may vary from system to system depending on the application.

The mass transfer device 112 may include packing, such as, for example, random packing, hydrophilic packing, and/or structural packing. Random packing is generally known in the art and refers to packing material introduced to the absorption stage in an un-organized fashion. Examples of random packing include, but are not limited to plastic, metal and/or ceramic packing material offered in different sizes, e.g., material having varying diameters, for example, diameters ranging between about 2.5 centimeters (2.5 cm) to about 7.6 centimeters (7.6 cm) (about 1 inch to about 3 inches). Random packing material is available from many suppliers, including, but not limited to Jaeger Products Inc. (Houston, Tex., United States). Random packing material may also include wood. Hydrophilic packing includes, but is not limited to polypropylene bags.

Structural packing is generally known in the art and refers to packing material that is arranged or organized in a specific fashion. Typically, structural packing is arranged in a manner to force fluids to take a complicated path, thereby creating a large surface area for contact between the liquid and gas. Structural packing includes, but is not limited to structures made of metal, plastic, wood, and the like. It is contemplated that different packing materials facilitate ammonia removal or reduction at different flow rates of a liquid into the wash vessel 102. Additionally, it is contemplated that the different packing materials may provide more suitable pressure drops.

In one embodiment, one of the absorption stages 109 or 110 of the wash vessel 102 includes random packing material as the mass transfer device 112 and another of the absorption stages 109 or 110 of the wash vessel 102 includes structural packing as the mass transfer device. For example, first absorption stage 109 may include random packing material as the mass transfer device 112 and second absorption stage 110 may include structural packing as the mass transfer device. It is contemplated that the $CO_2$ lean flue gas 106 enters the wash vessel 102 and passes through the first absorption stage 109 prior to passing through the second absorption stage 110.

In each of the absorption stages 109, 110, the mass transfer device 112 is located beneath the spray head system 114. Each of the spray head system 114 in wash vessel 102 sprays a liquid into the absorption stages 109, 110. The liquid is transported to the spray head system 114 via one of the liquid delivery paths 116. The liquid delivery paths 116 are conduits that transport the liquid to the respective spray head system 114. The liquid may be any liquid suitable to facilitate the removal of ammonia from the $CO_2$ lean flue gas 106. An example of a suitable liquid is water, which is known to absorb, i.e., dissolve, ammonia through interactions between the ammonia and the water.

In one particular embodiment, the liquid introduced to the second absorption stage 110 is liquid, e.g., water, provided by a stripping column 120. That is, water that has had all or substantially all of the ammonia as well as other contaminants contained therein removed and/or substantially removed. The liquid provided to the first absorption stage 109 is liquid 118 (also referred to as the washed liquid), which is water-containing a low concentration of ammonia recycled from the bottom of the wash vessel 102, which may be passed via pump 122 through an optional heat exchanger (not shown).

The liquid is introduced at the top of each absorption stage 109, 110, e.g., liquid 118 is provided to the top of first absorption stage 109 and liquid from the stripper 120 is provided to the top of second absorption stage 110 of the wash vessel 102 (as the ammonia polishing stage). The liquid travels in a direction down a length of the wash vessel 102, which is countercurrent to a direction that the $CO_2$ lean flue gas 106 travels. As will be appreciated, the liquid travels in direction by virtue of gravity, while the $CO_2$ lean flue gas 106 travels in a countercurrent direction by virtue of several factors, including pressure drops within the wash vessel 102.

As the liquid travels down the length of the wash vessel 102, the ammonia concentration in the liquid increases, thereby forming the ammonia-rich liquid 118. Conversely, as the $CO_2$ lean flue gas 106 travels in a direction up a length of the wash vessel 102, the ammonia concentration (as well as the concentration of the other water soluble contaminants) decreases, thereby forming a reduced ammonia-containing flue gas stream 124, which may be further treated such as being fed to a direct contact heater (DCH) and/or discharged into the atmosphere.

It should be appreciated that the amount of ammonia removed from the $CO_2$ lean flue gas 106 varies from system to system and application to application. It is also contemplated that the system be designed in a manner that the ammonia concentration in the reduced ammonia containing flue gas stream 124 is low and close to an equilibrium concentration of ammonia in the gas relative to the vapor pressure of the ammonia in the liquid. The equilibrium concentration of ammonia in the flue gas stream 124 may be as low as below ten parts per million (10 ppm) and typically in the range of between about zero parts per million (0 ppm) to about two hundred parts per million (200 ppm). In one embodiment, the reduced ammonia containing flue gas stream 124 contains at least about seventy percent (70%) less ammonia as compared to a level of ammonia in the $CO_2$ lean flue gas 106. In another embodiment, the reduced ammonia containing flue gas stream 124 contains at least about seventy five percent (75%) less ammonia as compared to a level of ammonia in the $CO_2$ lean flue gas 106. In yet a further embodiment, the reduced ammonia containing flue gas stream 124 contains at least about eighty percent (80%) less ammonia as compared to a level of ammonia in the $CO_2$ lean flue gas 106. In another embodiment, the reduced ammonia containing flue gas stream 124 contains at least about eighty five (85%) less ammonia as compared to a level of ammonia in the ammonia-containing flue gas stream 106. It is contemplated that the level of ammonia in the reduced ammonia containing flue gas stream 124 may be about ninety percent (90%), ninety five percent (95%), ninety nine percent (99%) or ninety nine and a half percent (99.5%) less than the level of ammonia in the $CO_2$ lean flue gas 106.

An effective flow rate of liquid suitable to reduce the amount of ammonia in the flue gas varies from system to system. In one embodiment, the flow rate is suitable to reduce an amount of ammonia in the flue gas to an amount close to the equilibrium concentration and typically to below two hundred parts per million (200 ppm) in the flue gas stream. In another embodiment, the flow rate is suitable to reduce an amount of ammonia in the flue gas from about two thousand parts per million (2000 ppm) to between about seventy parts per million and about one hundred parts per million (70-100 ppm). In another embodiment, the flow rate of the liquid is between about 1.8 liters per minute (1.8 lpm, or about 0.5 gallons per minute) to about 7.5 liters per minute (7.5 lpm or about 2 gallons per minute) per one thousand cubic feet per minute (1000 cfm) of flue gas. The liquid flow rate can be adjusted to the desired ammonia slip level from the wash vessel.

Still referring to FIG. 1, the liquid falls to the bottom of the wash vessel 102 and is removed therefrom as ammonia-rich liquid 118. A portion of the ammonia-rich liquid 118 may be recycled to the wash vessel 102 as liquid (WW) and a portion of the ammonia-rich liquid may be sent to the nanofiltration or reverse osmosis (also referred to herein as "NF/RO") unit 108, which is in series with stripping column 120. Additionally, while not shown, it is contemplated that the entire amount of the ammonia-rich liquid 118 may be sent to the stripping column 120 and then returned to the wash vessel 102. The feed stream 118 to the NF/RO unit 108 can be either from pump 122 or via separate pump (not shown).

The ammonia-rich liquid 118 fed to nanofiltration or reverse osmosis unit 108 is physically separated into two feed streams 130, 132. In feed stream 130, the ammonia concentration is increased relative to the ammonia concentration of the ammonia-rich liquid feed stream 118 to form an increased molarity ammonia rich liquid stream (i.e., retentate), whereas in feed stream 132, the ammonia concentration is decreased relative to the ammonia concentration of the ammonia liquid stream 118 to form a decreased molarity ammonia rich liquid stream (i.e., permeate).

The decreased molarity ammonia rich liquid stream 132 is recycled back to the second absorption stage 110 of the wash vessel 102 via liquid delivery system 116. The decreased molarity ammonia fluid stream 132 may be combined with stripped liquid 138 via conduit 133 after treatment in the stripper system 104. The stripped liquid 138, which is at an elevated temperature, passes through heat exchanger 136 so as to reduce the temperature of the stripped liquid 138. Optionally, all or a portion of the stripped liquid 138 may be diverted directly to the direct contact cooler or direct contact heater as may be desired.

In a typical chilled ammonia process, a $CO_2$ loaded solution (slip stream) is sent from the $CO_2$ wash water (not shown; $CO_2$ product cooler which is also known as ammonia polishing stage for the $CO_2$ product) to the wash vessel 102 to reduce the ammonia slip. In the present disclosure, a clean water solution 138 from the stripper 120 is sent to the $CO_2$ wash water via conduit 135 as shown in FIG. 1 to maintain the mass balance and the ammonia molarity in the $CO_2$ wash water.

After treatment in the nanofiltration or reverse osmosis unit 108, the increased molarity ammonia rich liquid stream 130 has an ammonia concentration higher than the wash liquid 118. Typically, the molarity of the washed liquid 118 in the water wash vessel 102 has a molarity of about 0.1 to 2.0 (mol $NH_3$/liter of solution). By feeding the washed liquid 118 into the nanofiltration or reverse osmosis unit 108, the molarity of the fluid stream 130 increases prior to introduction into the stripper column 120. In one embodiment, the ammonia molarity of fluid stream 130 is increased to about 3 to about 6, and in other embodiments, the ammonia molarity is increased to 6 to about 9, and in still other embodiments, the ammonia molarity is increased to about 9 to about 12. In other words, the ammonia molarity is increased from about 3 to about 12.

The temperature of the increased molarity ammonia-rich fluid stream 130 is increased by feeding the fluid stream through heat exchanger 136 prior to introduction into the stripper column 120, wherein the ammonia as well as other contaminants are removed from the increased molarity ammonia-rich fluid stream 130 to form an ammonia lean liquid 138, which may be pure water or substantially pure water having, for example, trace contaminants of ammonia. The stripping column 120 utilizes steam from reboiler 150 to remove the ammonia and the other contaminants from the increased molarity ammonia-rich fluid stream 130 to form the ammonia lean liquid 138 that can then be recycled to the wash vessel 102 or fed to the direct contact cooler or direct contact heater as may be desired in some applications. Recycling to the wash vessel 102 generally includes reducing the temperature ammonia lean liquid 138 by feeding through hat exchanger 136 and then through chiller 131 prior to introduction into the wash vessel 102.

It is contemplated that stripping column 120 may utilize other technology or techniques in order to remove the ammonia and other contaminants from the increased molarity ammonia-rich fluid stream 130. In one embodiment, the increased molarity ammonia-rich fluid stream 130a may be mixed with lean solution used in the absorber (ammonia solution or slurry) prior to introduction into the stripper to further increase the ammonia concentration of liquid 130 being fed to the stripper column 120 so as to further reduce the energy requirements of the stripper system 104. Optionally, the stripping column 120 may be operated at vacuum conditions to reduce the temperature of the steam utilized in the stripping column. In a typical Chilled Ammonia Process, the slip stream (lean solution) from the absorber-regenerator loop is processed via an appendix stripper (not shown) to maintain the water balance within the process. The appendix stripper bottom is sent to the direct contact cooling or direct contact heating (DCC/DCH) section and the top portion which contains ammonia and $CO_2$ is sent to the absorber. In the proposed process described herein, it is expected that the additional appendix stripper for water balance is advantageously not needed and the slip stream from the absorber-regenerator loop can be combined directly with the nanofiltration or reverse osmosis retentate (assuming it will have the same ammonia molarity as the lean solution from the absorber-regenerator loop) before processing through stripper. The extra water from the stripper can be sent from the bottom portion of stripper 120 to the DCC/DCH section via conduit 139 as shown in FIG. 1.

The fluid stream 140 including the recovered ammonia fluid and other volatile contaminants is discharged from a top portion 141 of the stripper column 120, cooled via chiller 142 and recycled to the absorber and/or recycled back to the stripper column 120. For example, the recovered ammonia fluid stream 140 may be recycled for use in the absorber as an ammoniated solution. However, it is contemplated that the ammonia may be utilized at other points inside and outside of system 100.

The following examples illustrate one or more embodiments described herein. The examples are not meant to limit the subject matter disclosed herein, but rather to illustrate one or more of the embodiments.

EXAMPLE 1

Figure 2:
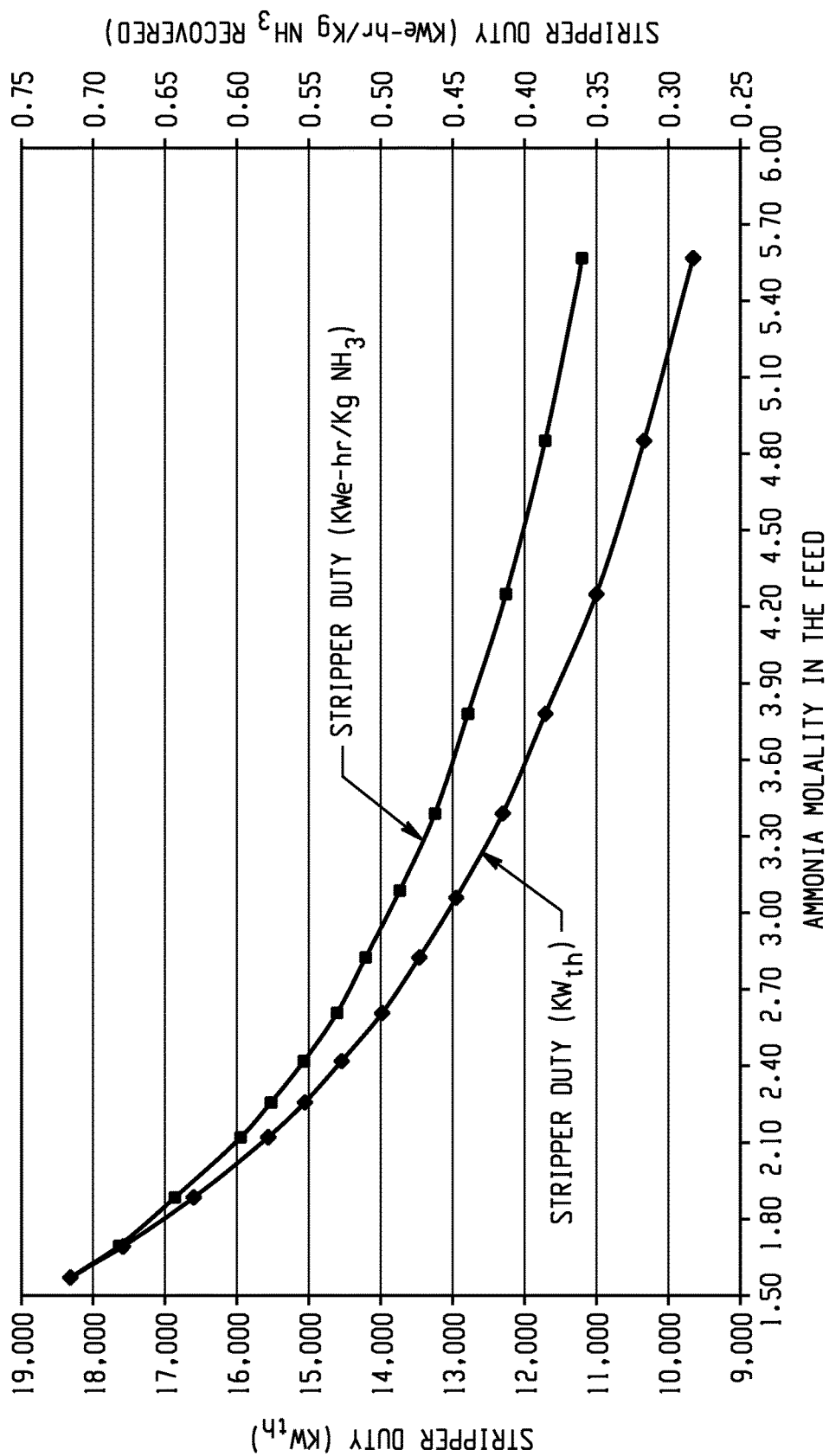
FIG. 2 graphically illustrates stripper duty as a function of ammonia molality.

In this example, stripper duty as a function of ammonia molality was measured in terms of kilowatts thermal (KWth) and kilowatts electrical-hours per kilogram of ammonia recovered (KWe-hr/kg $NH_3$ recovered). Inlet ammonia molality (m) was varied from about 1.50 to about 5.70 at a constant flow rate. The stripper feed had an Rvalue (moles $NH_3$/moles $CO_2$) of 2.0, a stripper operating pressure of 1.7 bara, and a temperature of 110° C. The ammonia concentration of the liquid at the stripper bottom was at about 0.1 molar (M). FIG. 2 graphically illustrates stripper duty as a function of the ammonia molality. As shown in FIG. 2, greater than about 50% stripper duty KWe-hr/kg $NH_3$ recovered can be reduced.

EXAMPLE 2

Figure 3:
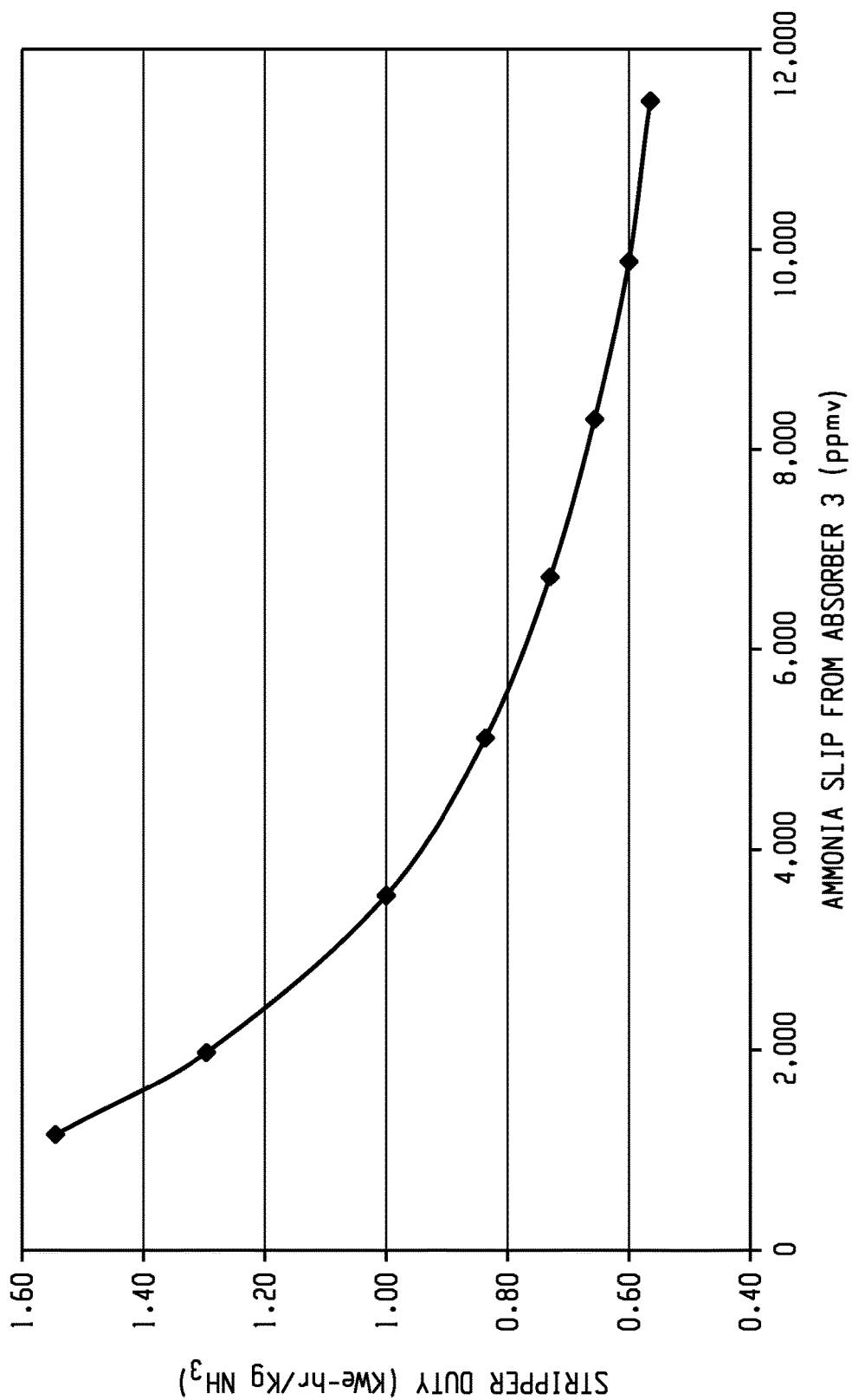
FIG. 3 graphically illustrates stripper power consumption as a function of ammonia slip from the absorber during operation.

In this example, stripper power consumption was measured as a function of ammonia slip from an absorber. The stripper feed from the water wash vessel had an Rvalue (moles of $NH_3$/moles of $CO_2$) of 2.0, a stripper operating pressure of 1.7 bara, and temperature of 110° C. The inlet ammonia containing flue gas entering the wash vessel was varied between about 1800 to about 11,500 parts per million by volume (ppmv) at a constant flow rate. The ammonia concentration of the liquid at the stripper bottom was at about 0.1 molar. FIG. 3 graphically illustrates stripper power consumption as a function of ammonia slip from the absorber during operation. As shown, increasing the amount of ammonia slip from the water wash vessel resulted in a lower specific stripper duty per Kg of ammonia recovered, thereby requiring lower power consumption requirements.

Advantageously, the high molarity retentate reduces the stripper steam consumption significantly as is evidenced by the data provided in FIG. 2. Current chilled ammonia processes typically use a reduced liquid to gas ratio (L/G) of about 0.2-0.5 on a mass basis for the water wash vessel top section for reducing steam consumption in the stripper as the specific heat duty of the water is very high. The proposed process and system allows the use of a higher L/G ratio to further reduce ammonia slip from the water wash, which also allows (helps) in sufficient packing wetting. It is further evident from FIG. 2 that the higher ammonia molarity in the stripper requires lower steam consumption but in the current chilled ammonia process it is not possible to operate the wash water at higher molarity otherwise the lower ammonia slip from the wash water cannot be maintained. In the proposed process, the wash water can operate at lower molarity and the stripper can operate at higher molarity, whereby ammonia slip from the wash water and the steam consumption the stripper are both reduced.

The higher molarity retentate also advantageously reduces the process equipment sizes by more than 50%, if desired. For example, cross heat exchangers, strippers, reboiler, condensers and the like can be reduced, and in some instances, eliminated.

Regarding FIG. 3, it is evident that the lower the ammonia slip from the absorber, the higher the specific energy consumption. Because of this relationship, the main absorber can operate at a higher temperature to provide higher ammonia slip, which ultimately will reduce the chiller duty in the absorber. This will directly save significant chiller power for the chilled ammonia process, thereby providing additional savings. By increasing the ammonia molarity, the specific stripper energy consumptions are exponentially reduced. Another advantage is that the main stripper can now be used for both ammonia recovery and water balance, thereby making it possible to eliminate an appendix stripper (assuming the nanofiltration or reverse osmosis retentate has the same ammonia molarity as the lean solution from the regenerator).

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wash system for removing ammonia slip in a chilled ammonia-based $CO_2$ removal system comprising a main absorber and regenerator, the wash system comprising:
   a wash vessel having a first input to receive a $CO_2$ lean flue gas from the main absorber subjected to the chilled ammonia-based $CO_2$, removal system, a spray head system, and a second input to receive a liquid for washing the $CO_2$ lean flue gas received from the main absorber;
   a separation unit having an input to receive washed liquid having an ammonia concentration from the wash vessel and physically separate the washed liquid into a first feed stream and a second feed stream, wherein the first feed stream has a decreased ammonia concentration relative to the ammonia concentration of the washed liquid, and wherein the second feed stream has an increased ammonia concentration relative to the ammonia concentration of the washed liquid;
   a stripper system having an input to receive the second feed stream with the increased ammonia concentration from the separation unit;
   a liquid delivery system for introducing the first feed stream from the separation unit to the wash vessel; and
   the stripper system comprises a stripper column and reboiler in fluid communication therewith to remove ammonia from the second feed stream to produce an ammonia lean solution; and
   a conduit configured to provide at least a portion of the ammonia lean solution to an absorption stage of the wash vessel.

2. The wash system of claim 1, wherein the liquid for washing the $CO_2$ lean flue gas comprises water.

3. The wash system of claim 1, wherein the separation unit is a nanofiltration or reverse osmosis unit.

4. The wash system of claim 1, wherein the washed liquid has a molarity of 0.1 to 2.0 mol/liter.

5. The wash system of claim 1, wherein the second feed stream has a molarity of 3 to 12 mol/liter.

6. The wash system of claim 1, wherein the ammonia in the chilled ammonia-based $CO_2$ removal system comprises ammonium ion, ammonia-$CO_2$-water reaction compounds, or dissolved molecular $NH_3$.

7. The wash system of claim 1, wherein the wash vessel is in fluid configuration with a direct contact heater configured for receiving a washed flue gas from the wash vessel.

8. The wash system of claim 1, wherein the stripper system diverts a portion of the ammonia lean solution to a direct contact cooler such that the chilled ammonia-based $CO_2$ removal system is free of an appendix stripper.

9. The wash system of claim 1, wherein at least a portion of the ammonia lean solution is diverted to a $CO_2$ wash water feed stream of the main absorber in an amount effective to maintain mass balance and ammonia molarity of the $CO_2$ wash water.

10. A process for reducing an amount of ammonia in a $CO_2$ lean flue gas stream resulting from a chilled ammonia-based $CO_2$ capture system comprising a main absorber and regenerator, the process comprising:
    washing the $CO_2$ lean flue gas stream received from the main absorber in a wash vessel having a spray head system-with a liquid to produce a washed liquid having an ammonia concentration;
    separating the washed liquid into a first feed stream and a second feed stream in a separation unit, wherein the first feed stream has a decreased ammonia concentration relative to the ammonia concentration of the washed liquid, and wherein the second feed stream has an increased ammonia concentration relative to the ammonia concentration of the washed liquid;
    recovering, in a stripper system, ammonia from the second feed stream received from the separation unit to produce an ammonia lean solution; and
    further comprising providing at least a portion of the ammonia lean solution to an absorption stage of the wash vessel.

11. The process of claim 10, wherein separating the washed liquid into the first and second feed streams comprises subjecting the washed liquid to a nanofiltration or reverse osmosis process.

12. The process of claim 10, further comprising diverting at least a portion of the ammonia lean solution to a direct contact cooler such that the main absorber and regenerator is free of an appendix stripper in fluid communication with the regenerator.

13. The process of claim 10, further comprising diverting at least a portion of the ammonia lean solution to a CO2 wash water feed stream of the main absorber in an amount effective to maintain mass balance and ammonia molarity.

14. The process of claim 10, further comprising providing at least a portion of the washed liquid to an absorption stage of the wash vessel.

15. The process of claim 10, wherein the wash liquid is water.

16. The process of claim 10, further comprising providing at least a portion of the ammonia lean solution to a direct contact cooler or a direct contact heater.

17. The process of claim 10, further comprising providing the recovered ammonia to an absorber of the chilled ammonia-based $CO_2$ capture system.

18. The process of claim 10, further comprising providing the first feed stream to the wash vessel.

19. The process of claim 10, wherein the $CO_2$ lean flue gas stream is an effluent of an absorber in a chilled ammonia process.

20. The process of claim 10, wherein the main absorber operates at a temperature range where the main absorber provides an increased ammonia slip with the $CO_2$ lean flue gas introduced into the wash vessel and reduces a chiller duty associated with the main absorber relative to a chilled ammonia system without the separation unit configured to provide the second feed stream with the increased ammonia concentration.

* * * * *